Patented Mar. 7, 1944

2,343,450

UNITED STATES PATENT OFFICE 2,343,450

MANUFACTURE OF NONKNOCKING MOTOR FUELS FROM LIQUID HYDROCARBONS BY CATALYTIC CRACKING

Gerhard Free and Wilhelm v. Füner, Ludwigshafen-on-the-Rhine, Germany; vested in the Alien Property Custodian No Drawing. Application May 14, 1940, Serial No. 335,118. In Germany January 9, 1939

6 Claims. (Cl. 196—52)

The present invention relates to a process for the manufacture of non-knocking motor fuels from liquid hydrocarbons by catalytic cracking.

As was known, non-knocking motor fuels are obtained by passing hydrocarbon oils over cracking catalysts at high temperatures. The use of catalysts containing silica, or hydrosilicates, such for example as natural or artificial silicates, especially aluminum or magnesium silicates, has also been proposed. These catalysts, however, frequently fall off in efficiency even after a short use and must then be reactivated.

We have now found that the efficiency of the said catalysts may be maintained for a considerably extended time by passing the initial materials thereover in a vaporous state along with gases having an oxidizing action and which may also contain saturated and/or unsaturated gaseous hydrocarbons, at a temperature of between 300° and 500° C. The gases having an oxidizing action may also be added intermittently, but the addition must not go beyond the explosion limit.

Among suitable initial materials we may mention, for example, benzines, middle oils or vaporizable heavy oils from mineral oils, tars or destructive hydrogenation products of carbonaceous substances, as for example of solid and liquid fuels.

In carrying out the process according to the present invention, these substances are passed over the catalyst in a vaporous state together with an oxidizing gas, for example air. In the case of air, for example, the addition amounts to 50 to 500 volumes of air for each volume of the initial material in the liquid state. Instead of air, an equivalent amount of other gases having an oxidizing action may be employed, for example oxides of nitrogen.

As catalysts we may mention natural bleaching earths which preferably have been activated by a treatment with acid, or artificial catalysts containing silicic acid, such as are described, for example in the copending application Ser. No. 222,144, filed July 30, 1938.

The reaction is carried out in general at a temperature of between 400° and 500° C., advantageously while increasing the temperature in the course of the reaction, and under atmospheric or increased pressure, for example from 2 to 50 atmospheres or even higher, for example 100 to 300 atmospheres. Provision may also be made for the pressure to rise or fall during the operation.

The following example serves to illustrate how the present invention may be carried out in practice, but the invention is not restricted to this example.

Example

A gas oil obtained from paraffin-base crude oil is passed in the vapor phase together with air over an aluminum silicate catalyst prepared by mixing silica sol with a solution of aluminum nitrate, precipitating with ammonia and heating the precipitate, the passage of the gases being carried out at 460° C. and at a rate of 1 liter of oil (calculated as a liquid) and 200 liters of air per each 2 liters of catalyst space and per hour.

The resulting product contains 25 per cent of gasoline having an octane number of 77, determined by the motor method. The catalyst retains its activity at least twice as long as when carrying out the operation in the absence of air.

What we claim is:

1. The process of manufacturing a non-knocking motor fuel from a liquid vaporizable hydrocarbon oil, which comprises passing said hydrocarbon oil completely vaporized at a temperature between 300° and 500° C. in the presence of a gas having an oxidizing action over a stationary hydrosilicate catalyst under conditions suitable to effect a substantial conversion of said hydrocarbon oil into gasoline and reactivating said catalyst after at least twice the time for which the catalyst retains its activity in the absence of said gas.

2. The process as claimed in claim 1, wherein the catalyst is an activated bleaching earth.

3. The process as claimed in claim 1, wherein the catalyst is an artificial aluminum silicate.

4. The process as claimed in claim 1, wherein the catalyst is an artificially prepared magnesium silicate.

5. The process as claimed in claim 1, wherein the gas having an oxidizing action contains a gaseous hydrocarbon.

6. The process as claimed in claim 1, wherein air is used as the gas having an oxidizing action.

GERHARD FREE.
WILHELM v. FÜNER.